(12) United States Patent
Cooper

(10) Patent No.: US 8,491,168 B2
(45) Date of Patent: Jul. 23, 2013

(54) DECORATIVE LIGHTS RETAINING CLIP

(76) Inventor: Robert James Cooper, Tewksbury, MA (US)

( * ) Notice: Subject to any disclaimer, the term of this patent is extended or adjusted under 35 U.S.C. 154(b) by 419 days.

(21) Appl. No.: 13/034,782

(22) Filed: Feb. 25, 2011

(65) Prior Publication Data

US 2012/0218759 A1    Aug. 30, 2012

(51) Int. Cl.
*F21V 21/00* (2006.01)
(52) U.S. Cl.
USPC ..... 362/398; 24/457; 248/316.7; 362/249.01; 362/249.07; 362/249.11; 362/396
(58) Field of Classification Search
USPC ..... D26/25, 60; 24/457, 458, 531; 248/316.7; 362/249.01, 249.07, 249.08, 249.11, 391, 362/396, 398
See application file for complete search history.

(56) References Cited

U.S. PATENT DOCUMENTS 3,540,687 A * 11/1970 Cuva .......................... 248/316.7
5,788,362 A * 8/1998 Chou ....................... 362/249.01

* cited by examiner

*Primary Examiner* — Stephen F Husar
(74) *Attorney, Agent, or Firm* — Bourque and Associates, PA

(57) ABSTRACT

A clip for quickly hanging strings of decorative lights with magnetic base lamp sockets on a home or building. The clip has a ferrous metal base with a hole in the center and a plurality of spaced-apart retaining tabs around the perimeter of the base extending a predetermined distance away from the base. Each of the plurality of spaced-apart retaining tabs has a groove on each side of the tabs to reduce weight. The clip is attached to wood with a screw or a nail or attached to metal or glass with a glue, epoxy or double sided adhesive tape.

12 Claims, 3 Drawing Sheets

DECORATIVE LIGHTS RETAINING CLIP

BACKGROUND OF THE INVENTION

1. Field of the Invention

The present invention relates generally to hanging strings of decorative lights on a home or building and more particularly, to a clip for removably attaching lamp sockets with magnetic bases of a string of decorative lights to a home or business building.

2. Description of Related Art

Hanging decorative lights on homes or buildings is typically done to celebrate festivals and holidays such as Christmas. Strings of lamps, each comprising a socket and a bulb, are often hung by plastic holders or by spaced-apart nails or staples which are inserted into molding boards along a roof line or down edges of the home or building to hold the wires interconnecting each of the lamps. However, plastic holders break and nails and staples rust. Further, unsightly nails or holes result after the strings of lamps are removed.

It is desirable to have a ferrous metal device or clip that attaches to a house or building for holding strings of lamp sockets with magnet bases, and when the strings of lamp sockets are removed, the device or clip cannot be seen when painted and lasts year after year. Further, it is desirable to have a clip that enables one person to hang a string of magnet lamp sockets in a horizontal or inclined direction. Once the clips are attached, strings of magnet lamp sockets are attached in the same locations every year.

Other examples of known devices in the art related to the mounting of continuous strands of decorative lights are disclosed in the following U.S. patents and patent Publications:

U.S. Pat. No. 3,189,310 discloses a Christmas outside light holder comprising a hollow plastic cylinder open at one end and sealed off at the other end. A hole at the sealed end receives a screw for attaching the cylinder to molding on a house. Slots in the cylindrical walls receive the wires of the string of lights. However, this light holder is subject to breakage, and it requires more time to insert a screw and to line up the wires in the slots, which time becomes significant when installing many on a house or building.

U.S. Pat. No. 5,788,362 discloses a light string fixing structure which mainly includes a fixing seat and a lampholder detachably connected to the fixing seat. The fixing seat can be fixedly mounted onto a desired position by extending a nail or screw in through a centered hole of the fixing seat into a wall surface or by glue or double-side adhesive tape. The lampholder has a flange around a rear end and the fixing seat is provided around a periphery with claws, such that when the lampholder is backward pushed into the fixedly mounted fixing seat, it is retained in place in the fixing seat by the engagement of the claws with the flange. However, the fixing seat with claws is limited to use with a lamp socket that requires a flange around the periphery of its base. The fixing seat is made of plastic so it will not attract a magnet in the base of a lamp socket. Also, plastic fixing seats break especially when pulling a lampholder out of the clamps on the fixing seat.

U.S. Pat. No. 7,367,697 discloses a decorative light support device comprising a bulb retention portion having an aperture and an affixation portion coupled to the bulb retention portion. The affixation portion comprises a first straddle member and a second straddle member. The first and second straddle members are configured to straddle an overhang portion of a roofing material and to at least partially affix the decorative light support device to the roofing material. The upper and lower straddle members have magnets for securing to a metal roof material instead of using a fastener. However, this light support device takes considerable time to install on a roof edge in comparison to the time to install the present invention for use with lamp sockets having a magnetic base.

U.S. Pat. No. 7,549,779 discloses a magnetic light fixture having a neodymium disc magnet embedded in the base allowing the assembly to be mounted magnetically to metal surfaces and having a pull strength of at least five (5) pounds. This invention is suitable for quick installation of strings of decorative lights when used with the present invention which is made of a ferrous metal such as steel that attracts magnets.

U.S. Patent Application Publication No. US 2009/0185370 discloses a Christmas light clip with magnets which has an elongated base, a post extending upward from the base, and a support arm extending from the post parallel to the base in cantilever manner. The support arm terminates in a resilient, C-shaped clamp adapted for gripping a Christmas light bulb socket. At least one magnet is attached to the bottom surface of the base, and is adapted for attaching the base to a metallic structure, such as a roof, a gutter, a window frame, etc. A plurality of the Christmas light clips may be used to attach a string of lights to the metallic roof. However, this light clip with magnets is limited to use on a ferromagnetic surface, whereas the present invention can be applied to various surfaces.

SUMMARY OF THE INVENTION

Accordingly, it is therefore an object of this invention to provide a plurality of clips that are attached to a home or building for easily and quickly mounting or removing a string of decorative lamps each having a magnetic lamp socket.

It is another object of this invention to provide a clip that can be attached to a wood surface by a screw or a nail or to a metal, glass, aluminum, plastic, slate and brick surfaces with a glue or epoxy material.

It is a further object of this invention to minimize the surface area of the clip by providing grooves in the base in order to reduce the clip's weight when glued to a metal such as an aluminum gutter, glass or asphalt shingles, or attached by two sided adhesive tape.

It is yet another object of this invention to provide a ferrous metal clip with retainer tabs for attaching lamp sockets with magnetic bases in a manner that prevents the lamp socket from sliding off the clip under adverse wind and snow conditions.

It is a further object of this invention to provide ferrous metal clips for mounting strings of decorative lamps with magnetic bases wherein once the ferrous metal clips are attached to a house or building, one person can hang the strings.

These and other objects are further accomplished by a clip comprising a base having a hole in a center of the base, a plurality of retainer tabs spaced around the perimeter of the base, the tabs extending a predetermined distance away from the base; each of the plurality of spaced retainer tabs comprises at least one groove in the base adjacent to each of the tabs. The clip comprises a ferrous metal, a zinc coating over the ferrous metal, and a predetermined diameter for receiving a lamp socket having a magnetic base. The hole in the base comprises a countersunk hole.

The objects are further accomplished by a method of hanging a string of decorative lamps on spaced-apart clips comprising the steps of attaching each of the clips to a surface, providing each of the clips with a plurality of spaced-apart retainer tabs around the perimeter of each of the clips, the tabs extending away from a base of the clip, providing at least one groove adjacent to the base of each of the retainer tabs, and providing magnetized means for attaching the string of decorative lamps to the spaced-apart clips. The method comprises the step of making the clip from a ferrous metal material. The method comprises the step of coating the clip with zinc. The step of attaching each of the clips comprises the step of providing a countersunk hole in the center of the base of the clip. The step of attaching the clips comprises the step of using one item from a group of screws, nails, glue and epoxy. The step of providing magnetized attaching means comprises the step of providing magnets in each lamp socket. The step of providing magnetized attaching means comprises the step of providing a plurality of magnetic devices for attaching portions of the string or decoration lamps to the clips.

Additional objects, features and advantages of the invention will become apparent to those skilled in the art upon consideration of the following detailed description taken in connection with the accompanying drawings of the preferred embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
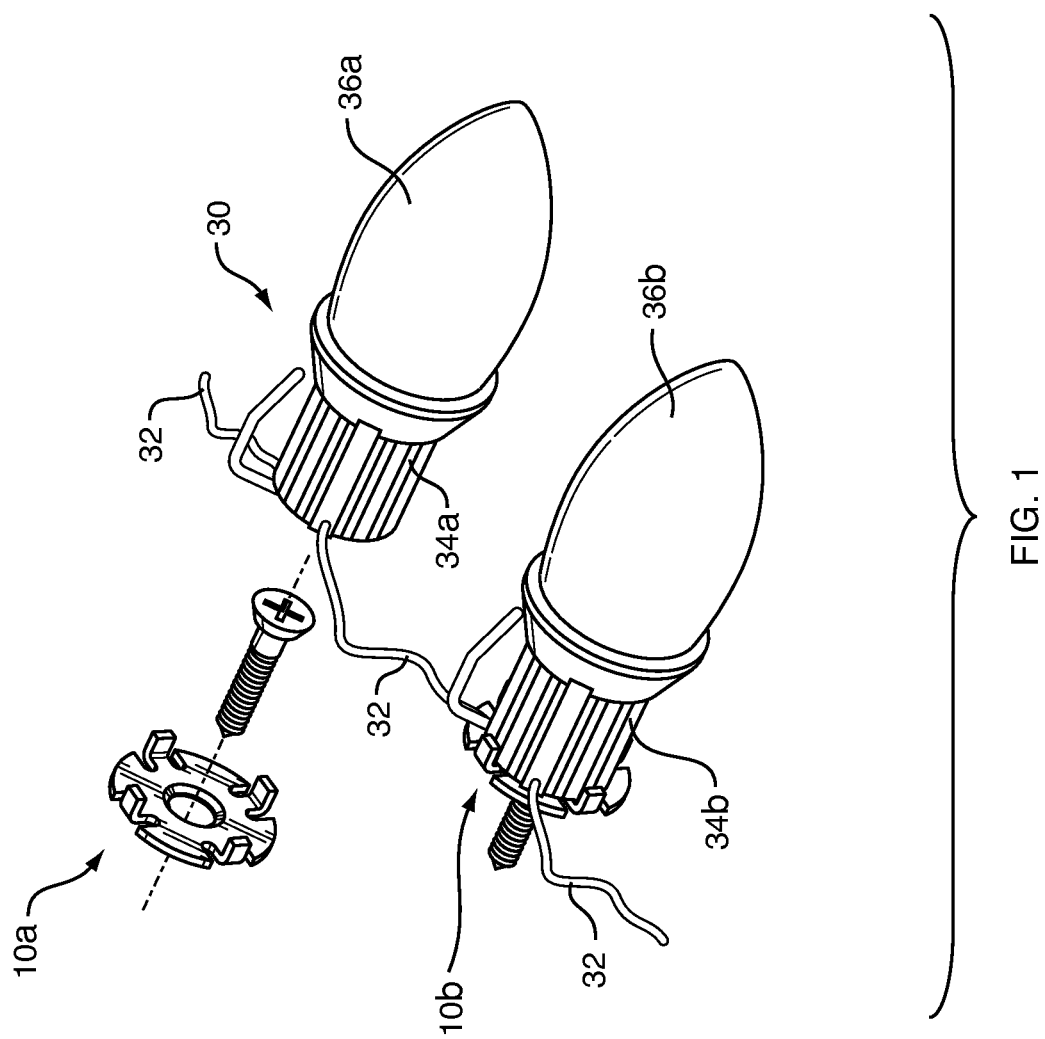
FIG. 1 is a perspective view of the present invention showing a string of decorative lights having a lamp socket attached and another lamp unattached to the invention.

Referring to FIG. 1, a perspective view of the present invention, clips 10a, 10b, shows a string of decorative lights 30 having a first lamp socket 34a not attached to clip 10a and a second lamp socket 34b attached to clip 10b. A first clip 10a is shown having a screw 22 positioned to secure the clip 10a to a surface, and a lamp socket 34 is positioned to be inserted into the first clip 10a. Each of the lamp sockets 34a and 34b includes a bulb 36a, 36b respectively. The sockets 34a, 34b are typically a C7/C9 light socket interconnected by wires 32. A second clip 10b is shown having a lamp socket 34b secured within the base of clip 34b. The lamp sockets 34a and 34b typically comprise magnets such as a neodymium magnet which is made from a combination of neodymium, iron and baron, and have a pull strength in the range of 5 lbs. to 16 lbs (See U.S. Pat. No. 7,549,779). The clip 10 may be used indoors or outdoors, and may be painted to blend in with the surface to which the clip 10 is attached.

Figure 2:
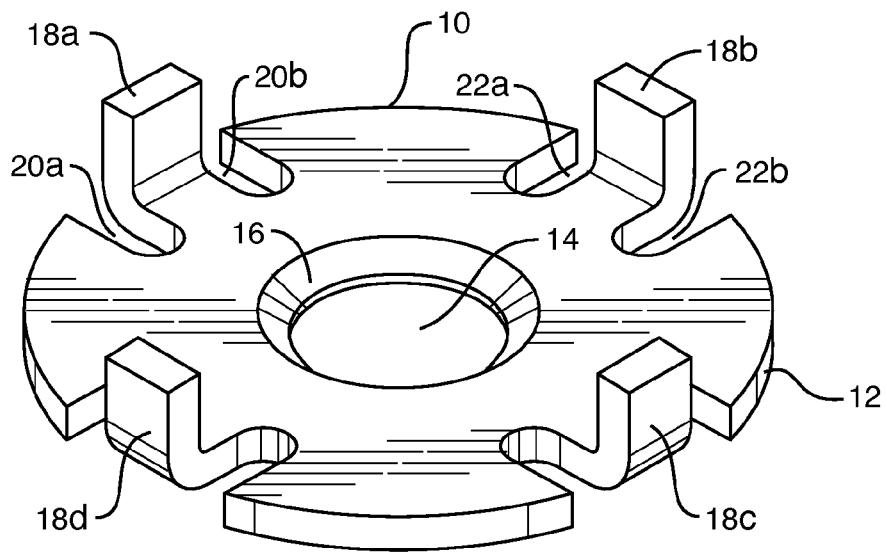
FIG. 2 is a perspective view of the present invention.
Figure 3:
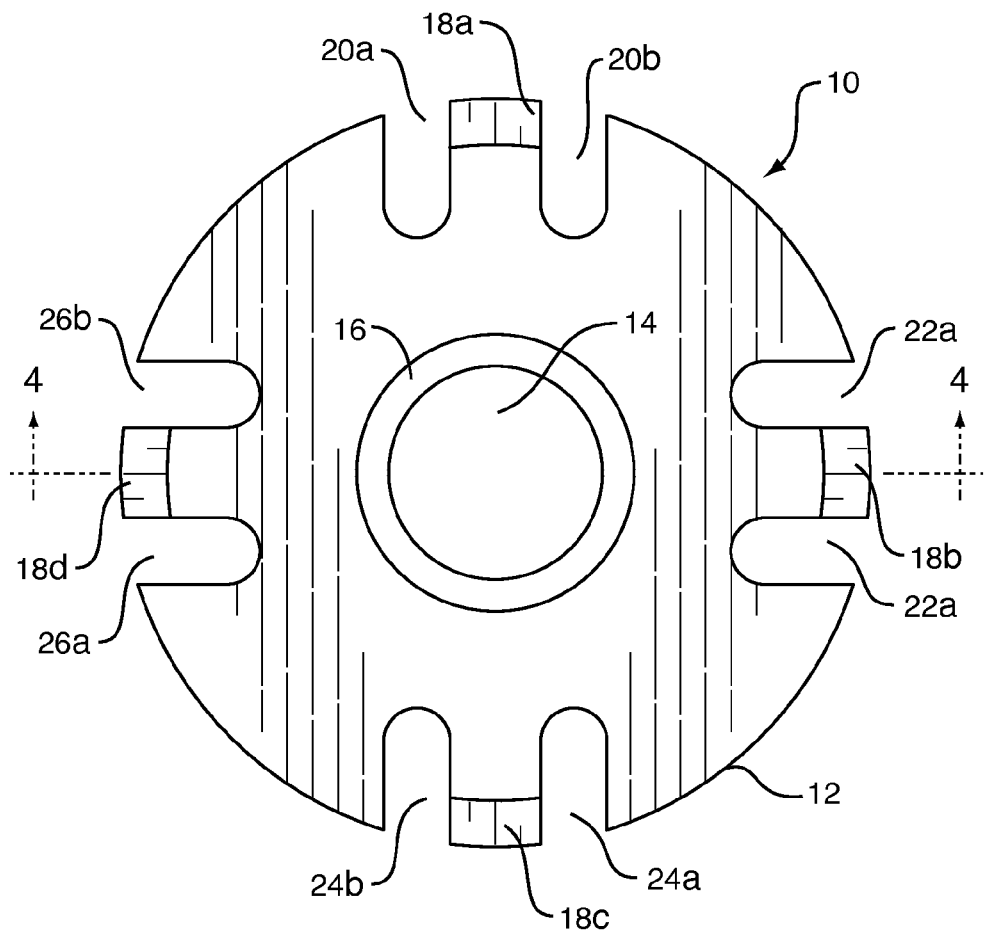
FIG. 3 is a top plan view of the present invention.

Referring to FIG. 2 and FIG. 3, FIG. 2 is a perspective view of the present invention, clip 10, and FIG. 3 is a top plan view of clip 10. Clip 10 comprises a base 12 with a hole 14 in the center of the base 12 for receiving a screw or a nail to attach the clip 10 to a surface such as a wall, molding or soffit on a house or building. The size of base 12 is approximately that of a "quarter" U.S. coin. The clip 10 is made of a ferrous metal such as cold rolled steel to facilitate the lamp sockets 34a, 34b being retained within the clip 10 due to a magnetic force from the magnet within the base of the lamp sockets 34a, 34b. The steel of clip 10 is coated with a layer of zinc to prevent rust. The clip 10 with the zinc coating may be painted the color of the surface to which the clip 10 is attached, and when the strings of decorative lamps are removed, the painted clip 10 is not readily seen.

A plurality of spaced-apart tabs 18a, 18b, 18c, and 18d are provided around the periphery of the clip 10, and the tabs 18a to 18d are generally perpendicular to the base 12 and extend approximately 0.125 inches above the surface of the base 12 which is approximately 0.062 inches thick for the present embodiment. The outside diameter of clip 10 is typically one inch. The inside diameter of clip 10 within the tabs 18a to 18d is slightly larger than a U.S. nickel coin, and therefore, the clip 10 is called the "NICKEL CLIP". FIG. 2 shows U-shaped grooves 20a and 20b in the base 12 and located on each side and adjacent to tab 18a, U-shaped grooves 22a and 22b in the base 12 and located on each side and adjacent to tab 18b, grooves 24a and 24b in the base 12 and located on each side and adjacent to tab 18c, and grooves 26a and 26b in the base 12 and located on each side and adjacent to tab 18d. Each of the U-shaped grooves in the preferred embodiment is approximately 0.090 inches wide and 0.125 inches deep. The width of each tab 18a-18d is approximately 0.125 inches. The dimensions provided are typical and may vary depending on clip size preferences for various applications. The U-shaped grooves 20, 22, 24, 26 remove weight from the clip 10 which is an advantage when attaching the clip 10 by glue or double sided adhesive tape to metal surfaces or windows. The grooves 20 to 26 also provide openings for water drainage, and provide space for glue to grasp the clip providing a stronger bond. The glue may be commonly available GEO-CEL 2321, and the double-sided adhesive may be embodied by Part No. Scotch 411-Long/DC made by 3M.

Figure 4:
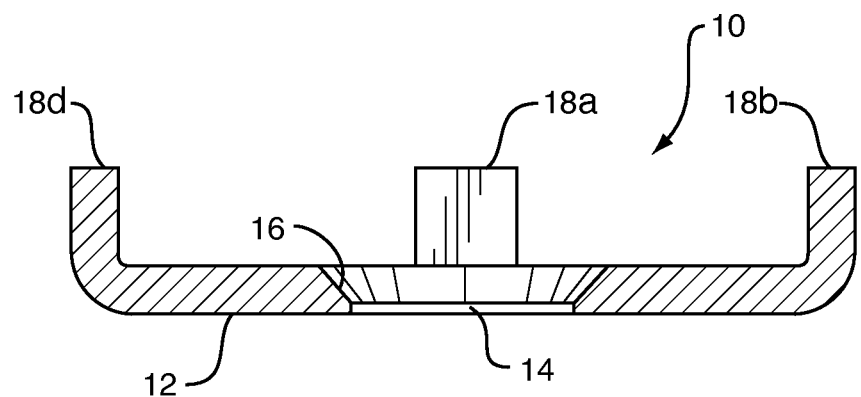
FIG. 4 is a side sectional view of the present invention along line 4-4 in FIG. 3.

Referring now to FIG. 4, a side sectional view of the clip 10 taken along line 4-4 in FIG. 3 shows three of the tabs 18a, 18b, and 18d and the hole 14 having the top part countersunk so that a screw of appropriate size will fit flush or below the surface. It has been noticed that when the clip 10 is glued to a surface, the hole 14 in the center of the clip 10 speeds up the glue drying process.

Figure 5:
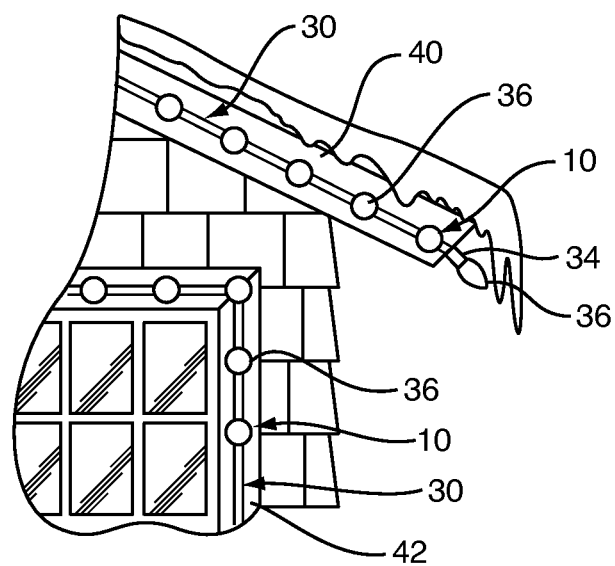
FIG. 5 is an environmental front elevational view of a corner of a building having Christmas lamps mounted on the building using the present invention.

Referring to FIG. 5, a front elevational view of a corner of a house or building with snow on a roof is shown having strings 30 of decorative lights hung along a beam or board 40 under the roof line and around a window frame 42. Each lamp of the string of lights 30 may be positioned and secured on a clip 10 and held in place by the magnetic force from the base of the lamp socket 34. Further, when there are strong winds or blowing snow that might cause the lamp socket 34 to move sideways, the tabs 18a-18d prevent such side movement. Also, tabs 18a-18d of clip 10 prevent magnetic lamp sockets after being positioned in the clips 10 from sliding and falling down during installation of the string of lamp sockets. The tabs 18a-18d of clip 10 enable one person to hang a string of magnetic lamps sockets in a generally horizontal or inclined direction resulting in lower cost and faster installation.

An alternative method of hanging strings 30 of decorative lights is to use a magnetic specialty clip made of plastic and containing a magnet. The specialty clip may be attached to the wires between lamp sockets or may slip on the base of the lamp socket thereby providing a magnetic means for attaching to clip 10 of the present invention. Such a magnetic specialty clip may be embodied by Item No. ML-MAGCLIP (also referred to as "MagnetiClip") from Magic Lights, LLC of Sugar Land, Tex.

This invention has been disclosed in terms of a preferred embodiment. It will be apparent that many modifications can be made to the disclosed apparatus and method without departing from the invention. Therefore, it is the intent of the appended claims to cover all such variations and modifications as come within the true spirit and scope of this invention.

What is claimed is:

1. A clip comprising:
a base having a hole in a center of said base,
a plurality of retainer tabs spaced around the perimeter of the base, said tabs extending a predetermined distance away from said base; and
each of said plurality of spaced retainer tabs comprises at least one groove in said base adjacent to each of said tabs.

2. The clip as recited in claim 1 wherein said clip comprises a ferrous metal.

3. The clip as recited in claim 2 wherein said clip comprises a zinc coating over said ferrous metal.

4. The clip as recited in claim 1 wherein said clip comprises a predetermined diameter for receiving a lamp socket having a magnetic base.

5. The clip as recited in claim 1 wherein said hole in said base comprises a countersunk hole.

6. A method of hanging a string of decorative lamps on spaced-apart clips comprising the steps of:

attaching each of said clips to a surface,
providing each of said clips with a plurality of spaced-apart retainer tabs around the perimeter of each of said clips, said tabs extending away from a base of said clip,
providing at least one groove adjacent to the base of each of said retainer tabs, and.
providing magnetized means for attaching said string of decorative lamps to said spaced-apart clips.

7. The method as recited in claim 6 wherein said method comprises the step of making said clip from a ferrous metal material.

8. The method as recited in claim 7 wherein said method comprises the step of coating said clip with zinc.

9. The method as recited in claim 6 wherein said step of attaching each of said clips comprises the step of providing a countersunk hole in the center of said base of said clip.

10. The method as recited in claim 6 wherein said step of attaching said clips comprises the step of attaching said clips using one item from a group of screws, nails, glue and epoxy.

11. The method as recited in claim 6 wherein said step of providing magnetized attaching means comprises the step of providing magnets in each lamp socket.

12. The method as recited in claim 6 wherein said step of providing magnetized attaching means comprises the step of providing a plurality of magnetic devices for attaching portions of said string of decoration lamps to said clips.

* * * * *